United States Patent
Chen et al.

(10) Patent No.: US 9,817,584 B2
(45) Date of Patent: Nov. 14, 2017

(54) STORAGE SYSTEM HAVING NODE WITH LIGHT WEIGHT CONTAINER

(71) Applicant: ProphetStor Data Services, Inc., Taichung (TW)

(72) Inventors: Wen Shyen Chen, Taichung (TW); Ming Jen Huang, Taichung (TW)

(73) Assignee: Prophetstor Data Services, Inc., Taichung (TW)

( * ) Notice: Subject to any disclaimer, the term of this patent is extended or adjusted under 35 U.S.C. 154(b) by 178 days.

(21) Appl. No.: 14/728,209

(22) Filed: Jun. 2, 2015

(65) Prior Publication Data
US 2016/0357451 A1 Dec. 8, 2016

(51) Int. Cl.
*G06F 3/06* (2006.01)
(52) U.S. Cl.
CPC ............ *G06F 3/0611* (2013.01); *G06F 3/065* (2013.01); *G06F 3/067* (2013.01); *G06F 3/0619* (2013.01); *G06F 3/0653* (2013.01); *G06F 3/0659* (2013.01)

(58) Field of Classification Search
CPC ...... G06F 3/0619; G06F 3/065; G06F 3/0653; G06F 3/0659; G06F 3/067; G06F 3/0611
USPC ........................................................ 709/235
See application file for complete search history.

(56) References Cited

U.S. PATENT DOCUMENTS

2012/0110055 A1* 5/2012 Van Biljon ............ G06Q 30/04
709/201

* cited by examiner

*Primary Examiner* — Tu Nguyen
(74) *Attorney, Agent, or Firm* — Che-Yang Chen; Law Offices of Scott Warmuth

(57) ABSTRACT

A storage system having nodes with light weight containers is disclosed by the present invention. The storage system includes: at least one cluster, having a number of nodes linked to one another, each node having: a node host, operated by a storage operating system, and installed with a number of service containers, which are used for providing specific services to clients and/or operations of the node out of the service containers; and at least one node storage device, operated by the storage operating system, for providing storing and accessing of data for the service containers; and a messaging module, linked to each node host, for bridging the node hosts and/or node hosts in different clusters. Coarse-grained REST APIs are used for communication between any two service containers to reduce chatty communication in the storage system.

12 Claims, 8 Drawing Sheets

Rule Set A

| Rule | Target | Property | Value | Result |
|---|---|---|---|---|
| 1 | Application | CPU Load | At least 50% left in the next 60 minutes | Add application containers to the node, until all of these rules failed |
| 2 | Application | IOPS | At least 50% left in the next 60 minutes | |
| 3 | Application | Network In | At least 40% left in the next 60 minutes | |

Rule Set B

| Rule | Target | Property | Value | Result |
|---|---|---|---|---|
| 4 | Application | CPU Load | At most 15% left in the next 60 minutes | Remove application containers from the node, until all of these rules failed |
| 5 | Application | IOPS | At most 15% left in the next 60 minutes | |
| 6 | Application | Network In | At most 25% left in the next 60 minutes | |

Fig. 8

STORAGE SYSTEM HAVING NODE WITH LIGHT WEIGHT CONTAINER

FIELD OF THE INVENTION

The present invention relates to a storage system. More particularly, the present invention relates to a storage system having architecture of light weight containers. It is scalable in capacity, intelligent in performance, and aware of applications.

BACKGROUND OF THE INVENTION

There are a couple of storage architectures applied in daily life. For example, the most welcome ones are SAN (Storage Area Network) and NAS (Network Attached Storage). SAN is a dedicated network that provides access to consolidated, block level data storage. It is mostly based on optical fiber as a connecting media for every servers and storages in the dedicated network. On the other hand, NAS is a file level computer data storage server connected to a computer network to provide data access to a heterogeneous group of clients. In NAS, storage devices are usually connected by network cables. Therefore, data that can be transmitted are more constrained than that of SAN due to the narrower bandwidth of connecting media. It is commonly used as a file server. Comparing to SAN, NAS has advantages of lower cost and convenient operation. Yet, SAN has higher performance and thus is more suitable for heavy load applications, such as databases or mail server services. Furthermore, NAS becomes unstable when more assesses are requested. Therefore, SAN is still preferred by most enterprises for their business operations.

In addition, a more and more popular technology for storage architecture is hyper-converged storage. It combines storage, computing, networking, and virtualization in one unit. Although these storage architectures are mature to apply in specific fields, there are still rooms for improvement. For example, for a SAN shown in FIG. 1, there are computation nodes (servers) 1, 2, and 3, and storage devices 4, 5, and 6. The whole system may be used to provide videos for clients. The storage device 4 is used for a user database, comprising users' personal information, ID, and password for registration. The storage device 5 is used for a metadata database. The metadata refers to where a selected video is physically stored. The storage device 6 is for storing and accessing videos. It is evident that the computation nodes 1, 2, or 3 need sending requests for clients to different storages devices in different stages of video services. Since the computation nodes and the storage devices are far away, data going back and forth between them incurs the waste of time and implies an inevitable cost of the system.

It is obvious that since all necessary hardware are built up in one unit, the hyper-converged storage system can settle the problem mentioned above. The hyper-converged storage system brings computation nodes close to storage devices and provides redundancy to storage devices. Information of knowing how much resources (CPU, storage, and network) are needed in the future is critical. However, most of hyper-converged storage systems cannot obtain such information. Moreover, no matter it is SAN or a hyper-converged storage system, storage devices are usually architected as application-agnostic. It means that storage devices are rarely optimized for applications, the stored data are neither coordinated for operation and deployment.

If we take a look at the operation of every storage devices, it is found that they are rarely architected for application's life cycle. Take FIG. 1 for example. Three types of data may be used at different levels of frequency in different stages. In the early stage, user database (e.g. MySQL) is more accessed because of user account creation. Afterwards, video metadata database (e.g. a MongoDB database) is more accessed because users are browsing videos. In the later stage, video datastore (e.g. Ceph storage) is more accessed because users are watching videos. Allocating different amount of resources, such as RAM or SSD for caching, to different stages is necessary for a cost-efficient system. Assigning more resources means waste; while assigning insufficient resources could cause latency longer than that required in SLA.

Therefore, an innovative storage system for solving the problems mentioned above is desired. The storage system should be intelligent for requests of applications and can achieve fast deployment. It can also maintain high-performance and be cost-effective. Most of all, the scalability of the storage system is highly expected and preferred.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to settle the problems mentioned above, a storage system is provided by the present invention. The storage system includes: at least one cluster, having a number of nodes linked to one another, each node having: a node host, operated by a storage operating system, and installed with a number of service containers, which are used for providing specific services to clients and/or operations of the node out of the service containers; and at least one node storage device, operated by the storage operating system, for providing storing and accessing of data for the service containers; and a messaging module, linked to each node host, for bridging the node hosts and/or node hosts in different clusters. Coarse-grained REST (REpresentational State Transfer) API (Application Programming Interface) is used for communication between any two service containers.

According to the present invention, the messaging module is a standalone server, a hardware built in a master node host to manage bridging of all node hosts, or an application program installed in each node host. Two service containers may communicate with each other through a native protocol. The service container may provide a storage service for operating the node storage device, a data service for operating databases, or an application service for providing the specific service.

The operating system may further comprises: a policy database, for storing rules which define conditions for each service container to be deployed in or removed from one node host; a distributed data processing engine, for coordinating every action of the specific service and the operations of the node out of the service containers of the node hosts, and processing the specific service and the operations; a policy engine, for computing data in the distributed data processing engine and deploying the service containers according to the rules in the policy database; a common library, for providing software logic for operating the node storage device, and image files of the service containers for deploying the service container; and an operating module, for configuring customized I/O scheduler and/or storage service cache mechanism, and operating the node storage device.

Preferably, the storage service is a monitoring service, for monitoring performance metrics of each service container in the node. The storage service is a traffic modeling service, for creating a traffic model of at least one performance metric in the node and generating prediction of the performance metric(s). The performance metric may be CPU load, IOPS (Input/output Per Second), throughput, or latency of the storage system, cache hit ratio, or throughput of a network the storage system applied to. The storage service may be an anomaly detecting service, for detecting unusual patterns of the performance metric obtained by the monitoring service.

The rule is: if a node host has a storage service with higher CPU load than a threshold value, more service containers of that storage service are deployed on other node hosts; if a cluster has lower average CPU load of a storage service than a threshold value, excess service containers of that storage service can be removed; if a node host has a storage service with higher storage load or higher latency than a threshold value, more service containers of that storage service are deployed on other node hosts; if a node host has a storage service with higher network load or more network throughput than a threshold value, more service containers of that storage service are deployed on other nodes; if a node host has a higher predictive performance load than a threshold value, excess service containers can be removed from that node; if a node host has an anomaly detected, excess service containers can be removed from that node; if a detected anomaly exceeds a threshold value, all of the service containers in that node are removed; service containers of the storage service are deployed as close to the node storage device storing the data they need to access as possible; if a node host has a data service with higher CPU load than a threshold value, more service containers of that data service are deployed on other node hosts; if a cluster has lower average CPU load of a data service than a threshold value, excess service containers of that data service can be removed; if a node host has a data service with higher storage load or higher latency than a threshold value, more service containers of that data service are deployed on other node hosts; if a node host has a data service with higher network load or more network throughput than a threshold value, more service containers of that data service are deployed on other nodes; if a node host has an application service with higher CPU load than a threshold value, more service containers of that application service are deployed on other node hosts; if a cluster has lower average CPU load of an application service than a threshold value, excess service containers of that application service can be removed; if a node host has an application service with higher storage load or higher latency than a threshold value, more service containers of that application service are deployed on other node hosts; or if a node host has an application service with higher network load or more network throughput than a threshold value, more service containers of that application service are deployed on other nodes.

BRIEF DESCRIPTION OF THE DRAWINGS

FIG. 8 shows a number of detailed rules.

DETAILED DESCRIPTION OF THE PREFERRED EMBODIMENTS

The present invention will now be described more specifically with reference to the following embodiments.

Figure 1:
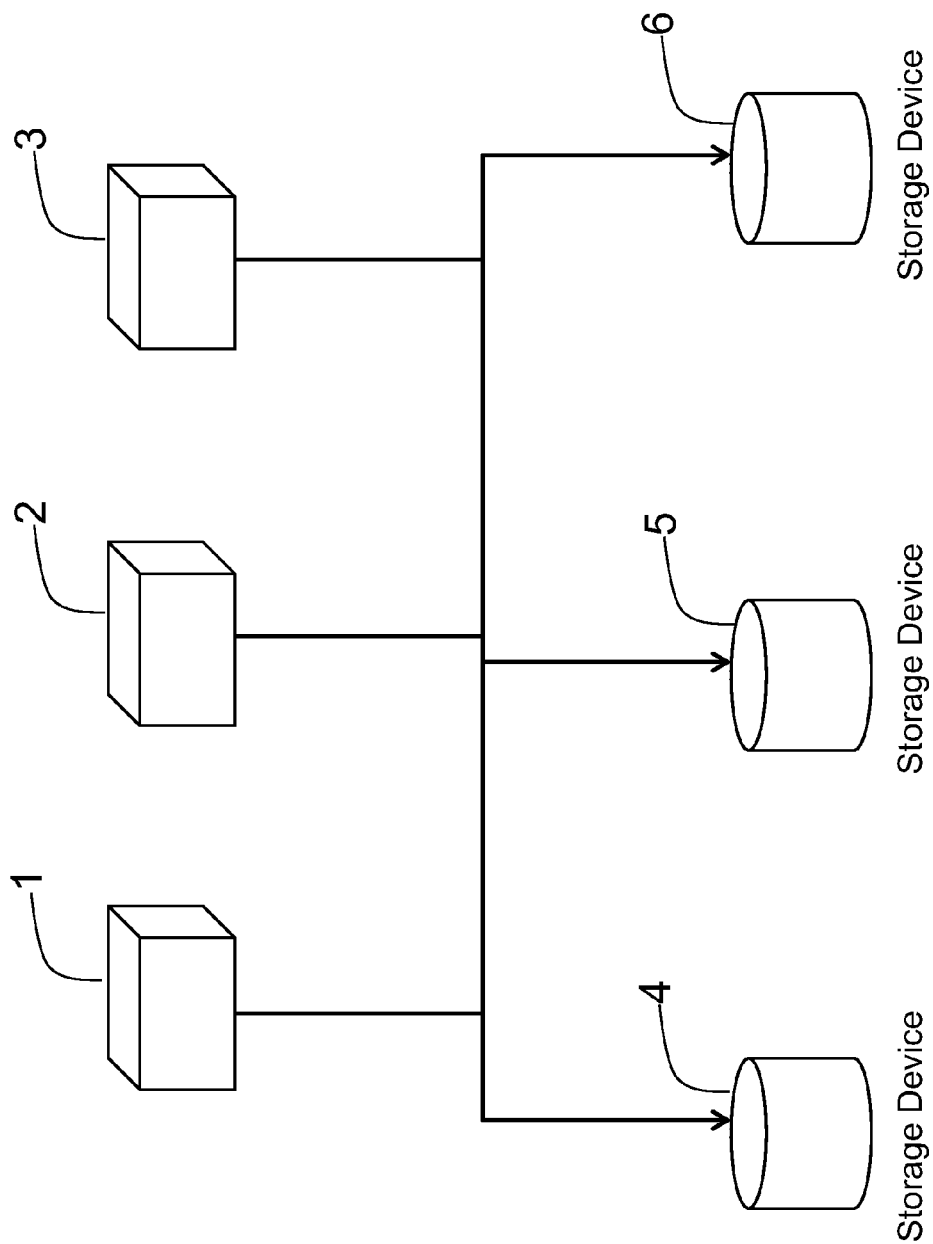
FIG. 1 shows a conventional SAN.
Figure 2:
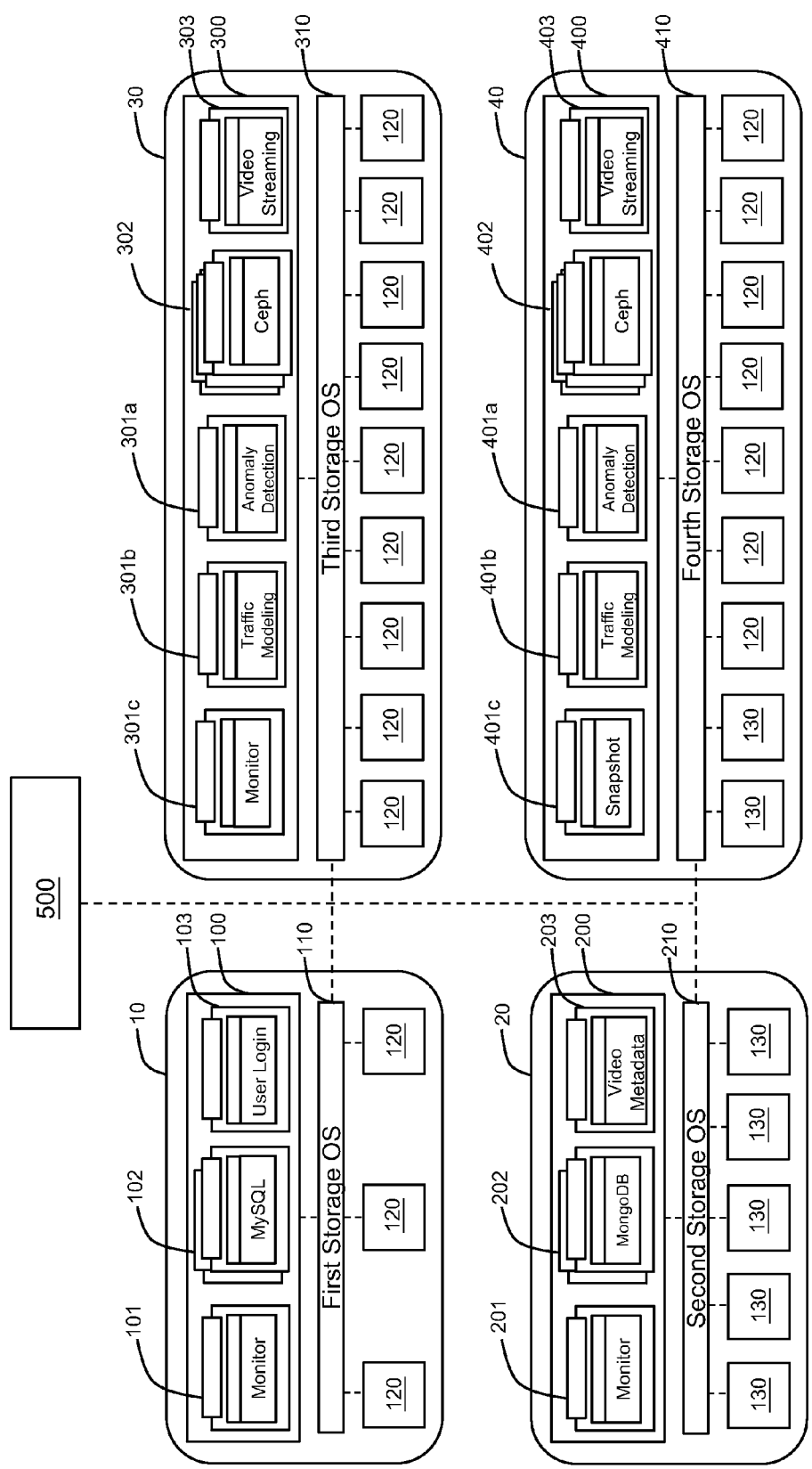
FIG. 2 shows an embodiment of a storage system according to the present invention.

Please refer to FIG. 2. An embodiment of a storage system according to the present invention is disclosed. The storage system is composed of a messaging module 500 and a cluster of nodes. They are a first node 10, a second node 20, a third node 30, and a fourth node 40. It should be noticed that the number of nodes is not limited by the present invention. The four nodes are just used for illustration of the present invention. In fact, any number of nodes is workable. There are 4 nodes in the cluster and they link to one another. The connecting media may be using optical fiber or general Ethernet cables for network.

Each node has a node host and at least one node storage device. For different functionality, the number and type of the node storages may vary. Each node host is operated by a storage operating system and installed with a number of service containers. Thus, the node host can provide specific services to clients out of the service containers. It can also provide the specific services for operations of the node. Of course, the specific services and the operations of the node may be provided from the same node host. At least one node storage device is also operated by the storage operating system. It (or they) can provide storing and accessing of data for the service containers. The service container installed in any node host may provide a storage service for operating the node storage device. It may provide a data service for operating databases. Or the service container provides an application service which can provide the specific service mentioned above.

It should be noticed that the service container should be a light weight container. Different from a heavy weight container which is managed by the underlying operating system on which programs are run, the light weight container is an isolated runtime environment running within the operating system. For example, the light weight container may be a JAVA runtime environment while the heavy weight container may be a virtual machine. It can also be a process container which is created by using cgroups. The cgroups is a Linux kernel feature. For illustrative purpose hereinafter, if a service container is for providing a storage service which works for operation of the node, it is defined as a storage container. Similarly, if a service container is for providing a data service, it is defined as a data container. If a service container is for providing an application service, it is defined as an application container.

Figure 3:
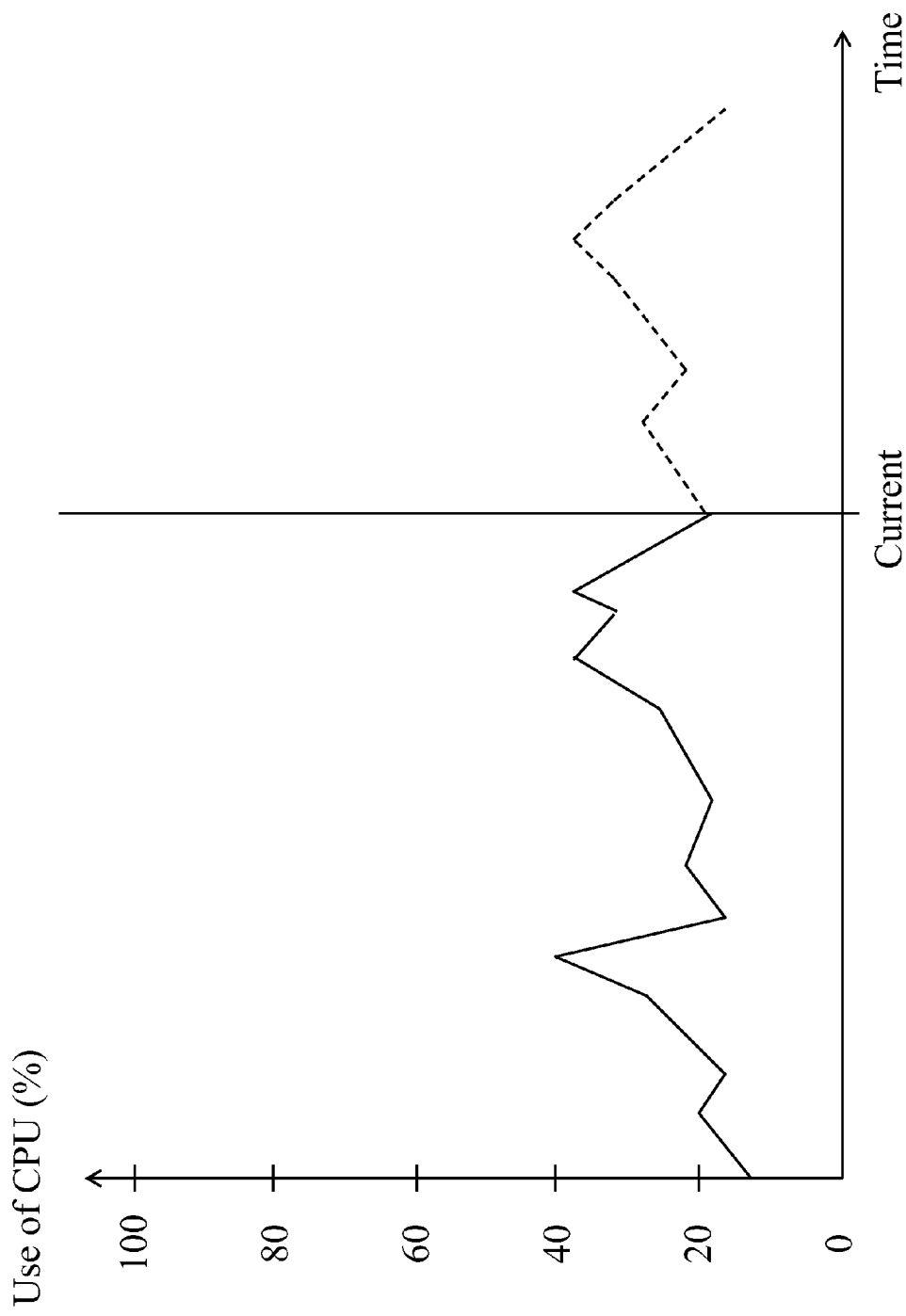
FIG. 3 is a record and prediction of CPU use.

In this embodiment, the storage system is used to provide a video streaming service. The first node 10 includes a first node host 100 and three HDDs (hard driver) 120. The first node host 100 and three HDDs are driven by a first storage operating system 110. The first node host 100 is installed with a storage container 101, 2 data containers 102, and an application container 103. The storage service provided by the storage container 101 is a monitoring service. The monitoring service can monitor performance metrics of each service container in the first node 10. The performance metric mentioned here and below refers to CPU load of the first node host 100, IOPS (Input/output Per Second), throughput, or latency of the storage system, cache hit ratio, or throughput of a network the storage system applied to. For example, the storage container 101 can provide the service for the first node host 100 to monitor and record use of the CPU (%) with time till now. Please see FIG. 3. The record is illustrated by the solid broken line. The data containers 102 are both MySQL databases. They are used to store user data, such as user name, password, address, phone number, email address, gender, etc., of every user. The user data are used to process registration for a user. Because there are too many requests for user login and workload for one data container 102 is heavy, the second data container 102 is deployed to maintain a smooth operation of the first node host 100. The application container 103 provides an application service for user login. It deals with interacting with requests from the clients and feedbacks a message if the login is successful or failed thereto. The first storage operating system 110 is a ZFS-based storage operating system. It can provide back-end storage for virtualization and backup.

The second node 20 includes a second node host 200 and 5 SSDs (solid state drive) 130. The second node host 200 and the SSDs 130 are driven by a second storage operating system 210. The second node host 200 is installed with a storage container 201, 2 data containers 202, and an application container 203. The storage service provided by the storage container 201 is also a monitoring service. The monitoring service works as that of the storage container 101. It is not repeated again. The data containers 102 are both MongoDB databases. They are used to store video metadata. The video metadata contains the information where a video is stored. When a login user chose a video from a browser interface, the request is sent to the second node 20. When the address of the video is found by one of the data container 202, the application container 203 will redirect the client to the node the video is stored. Similarly, since there are too many requests for accessing the metadata and workload for one data container 202 is heavy, the second data container 202 is deployed. The application container 203 provides an application service which plays a role as a relay. The second storage operating system 210 may be a Linux-based storage operating system. Comparing the first node 10 and the second node 20, it is known that the number and type of node storage devices are not necessary to be the same. Meanwhile, storage operating systems of each node can also vary for different tasks.

Figure 4:
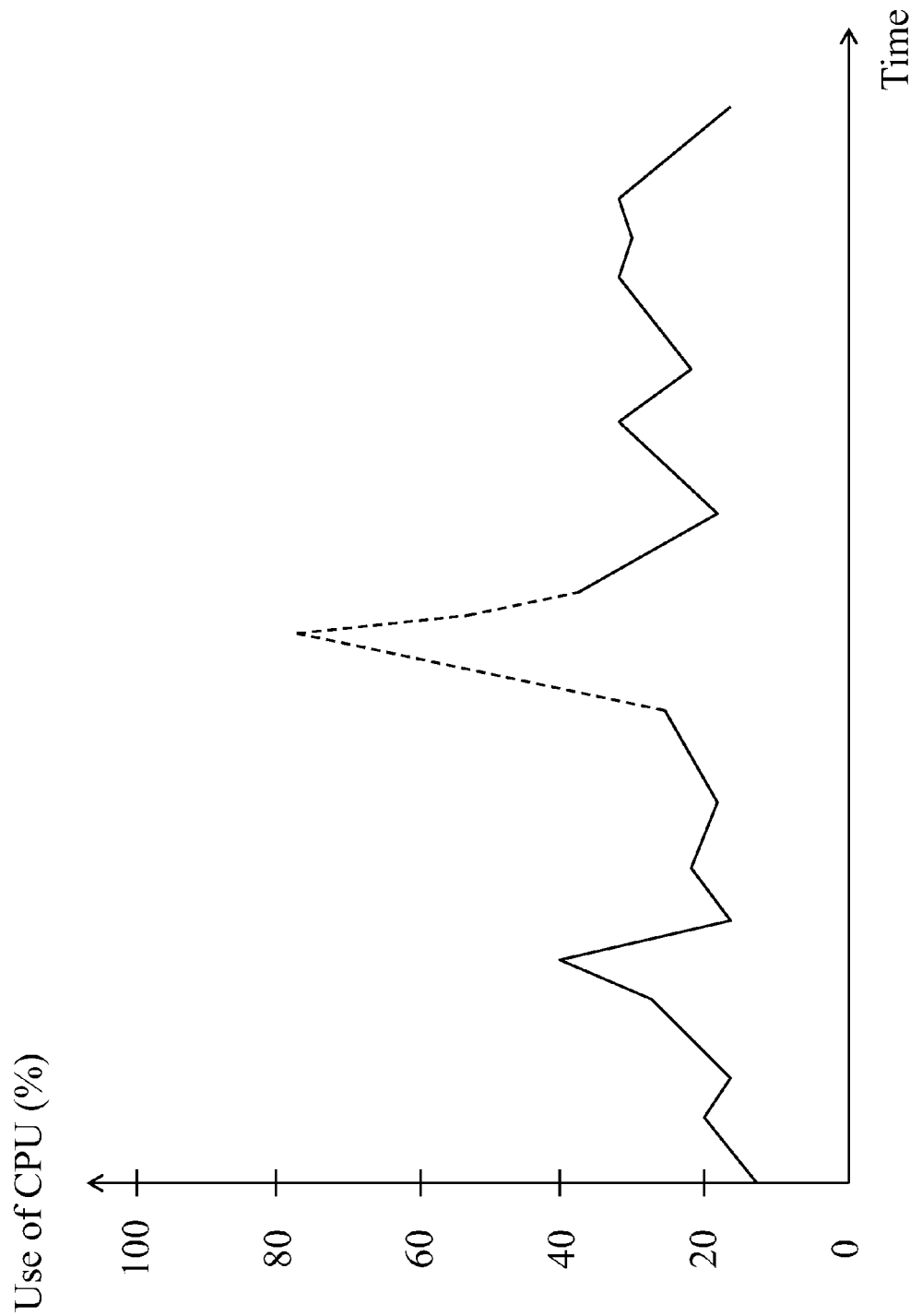
FIG. 4 shows an anomaly in a record of CPU use.

The third node 30 has a third node host 300 and 9 HDDs 120. The HDDs 120 may be a RAID. The third node host 300 and the HDDs 120 are driven by a third storage operating system 310. The third node host 300 is installed with a first storage container 301a, a second storage container 301b, a third storage container 301c, three data containers 302, and an application container 303. Obviously, the third node host 300 has more operating functions than the first node host 100 and the second node host 200. The storage service provided by the first storage container 301a is an anomaly detecting service. It can detect unusual patterns of the performance metric obtained by the monitoring service. Please see FIG. 4. Detected unusual patterns of CPU load are plotted by dashed broken lines. Anomaly usually implies a malfunction of software, hardware, or even malicious usage. Storage operating system will take actions before anything goes wrong. The storage service provided by the second storage container 301b is traffic modeling service. It can create a traffic model of at least one performance metric in the third node 30 and to generate prediction of the performance metric(s). Please come back to FIG. 3 again. The dashed broken lines illustrate the prediction of the CPU load in the future. Any suitable methods or algorithms that provide such service can be applied. The storage service provided by the third storage container 301c is a monitoring service. The monitoring service works as that of the storage container 101. It is not repeated again.

The data containers 302 are both Ceph storages. They are used to store a portion of video files and provided the files for video streaming service. When a request from the application container 203 asks for accessing a video file therein, one of the data containers 302 starts to transfer the file segments by segments. Since there are too many requests asking for different videos, one data container 302 is not enough. There are three data container 302 deployed. The application container 303 provides an application service of transferring the segmented files to each client with available bandwidth. The third storage operating system 310 is also a Linux-based storage operating system.

The fourth node 40 has a fourth node host 400, 2 SSDs 130 and 7 HDDs 120. The 7 HDDs 120 can be a RAID. The SSDs 130 are used to store some frequently accessed files for fast retrieval. The fourth node host 400, the SSDs 130, and the HDDs 120 are driven by a fourth storage operating system 410. The fourth node host 400 is installed with a fourth storage container 401a, a fifth storage container 401b, a sixth storage container 401c, three data containers 402, and an application container 403. The storage service provided by the fourth storage container 401a is an anomaly detecting service like the first storage container 301a does. Functions the anomaly detecting service can provide are not repeated here. The storage service provided by the fifth storage container 401b is the same as the second storage container 301b. The storage service provided by the sixth storage container 401c is a snapshot service. The snapshot service takes snapshot of the node storage devices (SSDs 130 and the HDDs 120) in case a recovery of lost data of LUNs are requested. The data containers 402 are both Ceph storages. Similarly, they are used to store another portion of video files and provided the files for video streaming service. They work as what the data containers 302 do. The application container 403 provides an application service of transferring the segmented files to each client. The fourth storage operating system 410 is also a Linux-based storage operating system.

Figure 5:
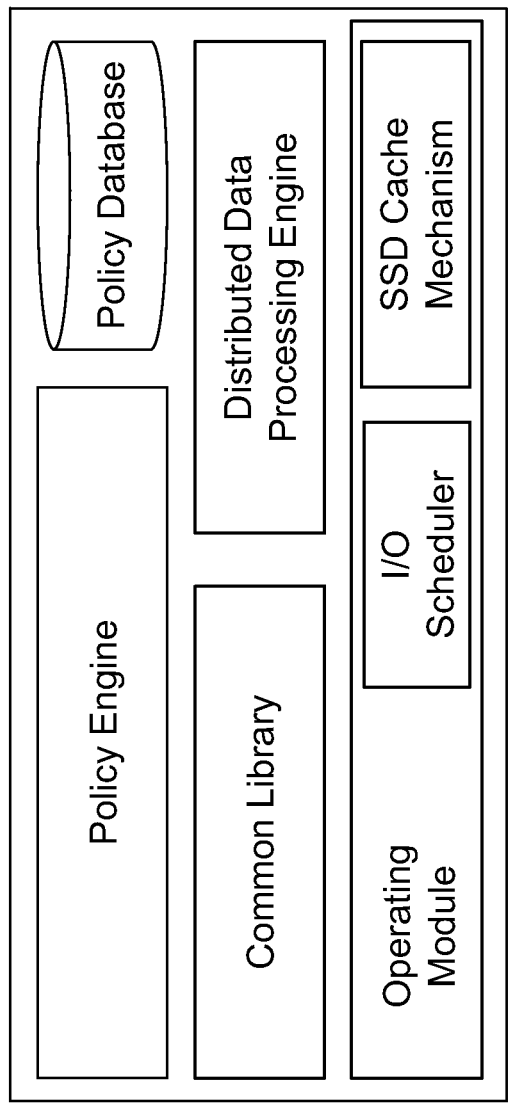
FIG. 5 is a structure of a storage operating system.

Although the storage operating systems in the nodes may be the same or different, architecture of each one should have below elements. Please refer to FIG. 5. The architecture of the operating system comprises: a policy database, a distributed data processing engine, a policy engine, a common library, and an operating module. The policy database stores rules which define conditions for each service container to be deployed in or removed from one node host. According to the present invention, any service container can be deployed on demand. Any service container can be removed if the workload of that service container in one node host can be carried out by the rest service containers of the same type. For different service container, different rules are applied. The rules are illustrated below.

If a node host has a storage service with higher CPU load than a threshold value, more service containers of that storage service are deployed on other node hosts. If a cluster has lower average CPU load of a storage service than a threshold value, excess service containers of that storage service can be removed. If a node host has a storage service with higher storage load or higher latency than a threshold value, more service containers of that storage service are deployed on other node hosts. If a node host has a storage service with higher network load or more network throughput than a threshold value, more service containers of that storage service are deployed on other nodes. If a node host has a higher predictive performance load than a threshold value, excess service containers can be removed from that node. If a node host has an anomaly detected, excess service containers can be removed from that node. If a detected anomaly exceeds a threshold value, all of the service containers in that node are removed. Service containers of the storage service are deployed as close to the node storage device storing the data they need to access as possible. If a node host has a data service with higher CPU load than a threshold value, more service containers of that data service are deployed on other node hosts. If a cluster has lower average CPU load of a data service than a threshold value, excess service containers of that data service can be removed. If a node host has a data service with higher storage load or higher latency than a threshold value, more service containers of that data service are deployed on other node hosts. If a node host has a data service with higher network load or more network throughput than a threshold value, more service containers of that data service are deployed on other nodes. If a node host has an application service with higher CPU load than a threshold value, more service containers of that application service are deployed on other node hosts. If a cluster has lower average CPU load of an application service than a threshold value, excess service containers of that application service can be removed. If a node host has an application service with higher storage load or higher latency than a threshold value, more service containers of that application service are deployed on other node hosts. If a node host has an application service with higher network load or more network throughput than a threshold value, more service containers of that application service are deployed on other nodes.

Figure 6:
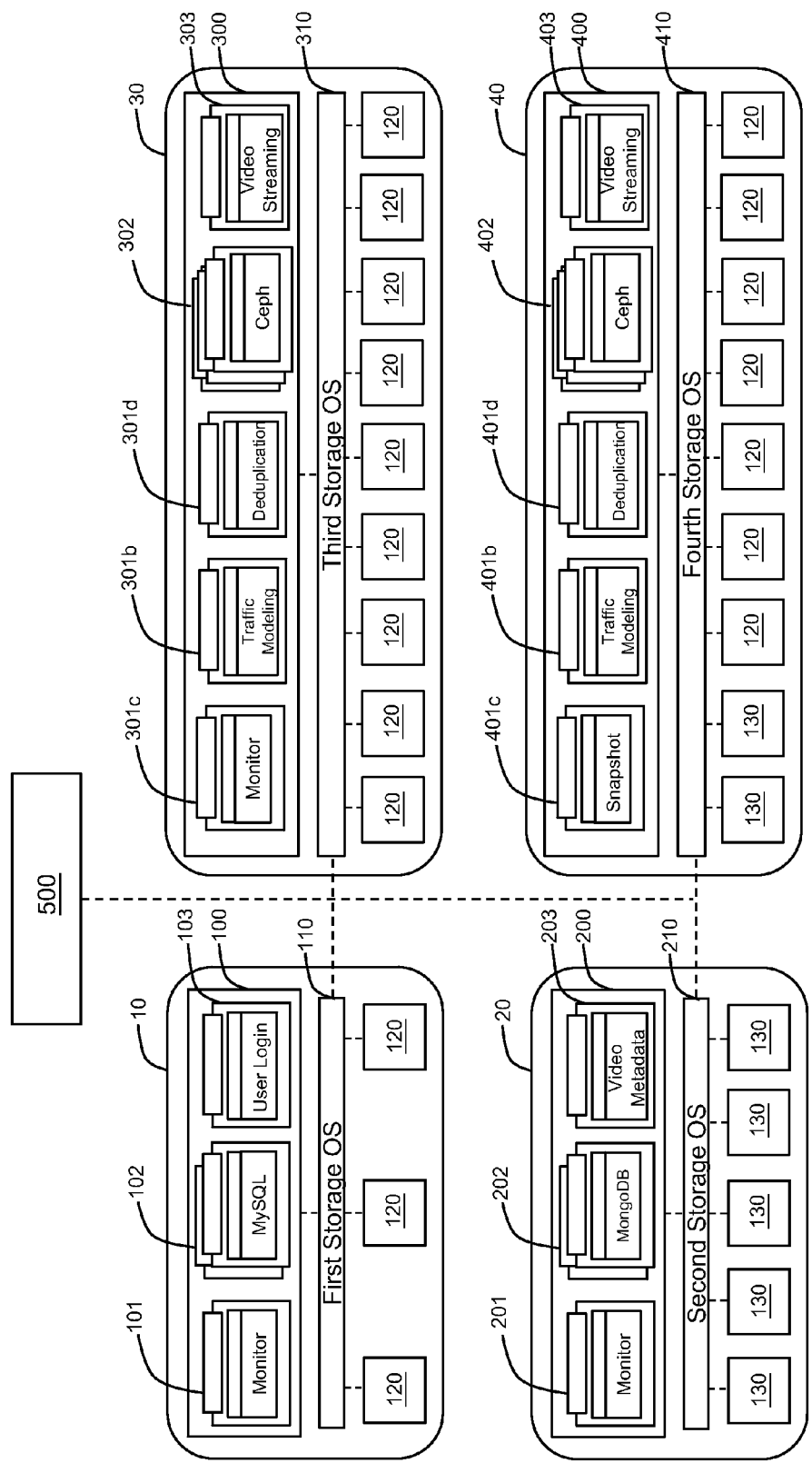
FIG. 6 shows another embodiment of a storage system according to the present invention.

The distributed data processing engine coordinates every action of the specific service and the operations of the node out of the service containers of the node hosts, and processes the specific service and the operations. For coordinating actions of a specific service, please see FIG. 2 again. If a video file is too large and stored in one data container 302 and one data container 402, the distributed data processing engine helps file connection during video streaming. For coordinating actions of operations, in order to have a better understanding about the distributed data processing engine, another embodiment shown in FIG. 6 is used here for illustration. By using the same elements in FIG. 2 while the first storage container 301*a* and the fourth storage container 401*a* are replaced by a seventh storage container 301*d* and an eighth storage container 401d, respectively. The seventh storage container 301*d* and the eighth storage container 401*d* provide deduplication service. When the storage system starts deduplication, it is co-processed by the same type of services container, the seventh storage container 301*d* and the eighth storage container 401*d*, this process is coordinated by the distributed data processing engine. Deduplication services from the seventh storage container 301*d* and the eighth storage container 401*d* get data duplicated from data store that is close to it (in the same node) and to the original node storage device or another assigned one.

Figure 7:
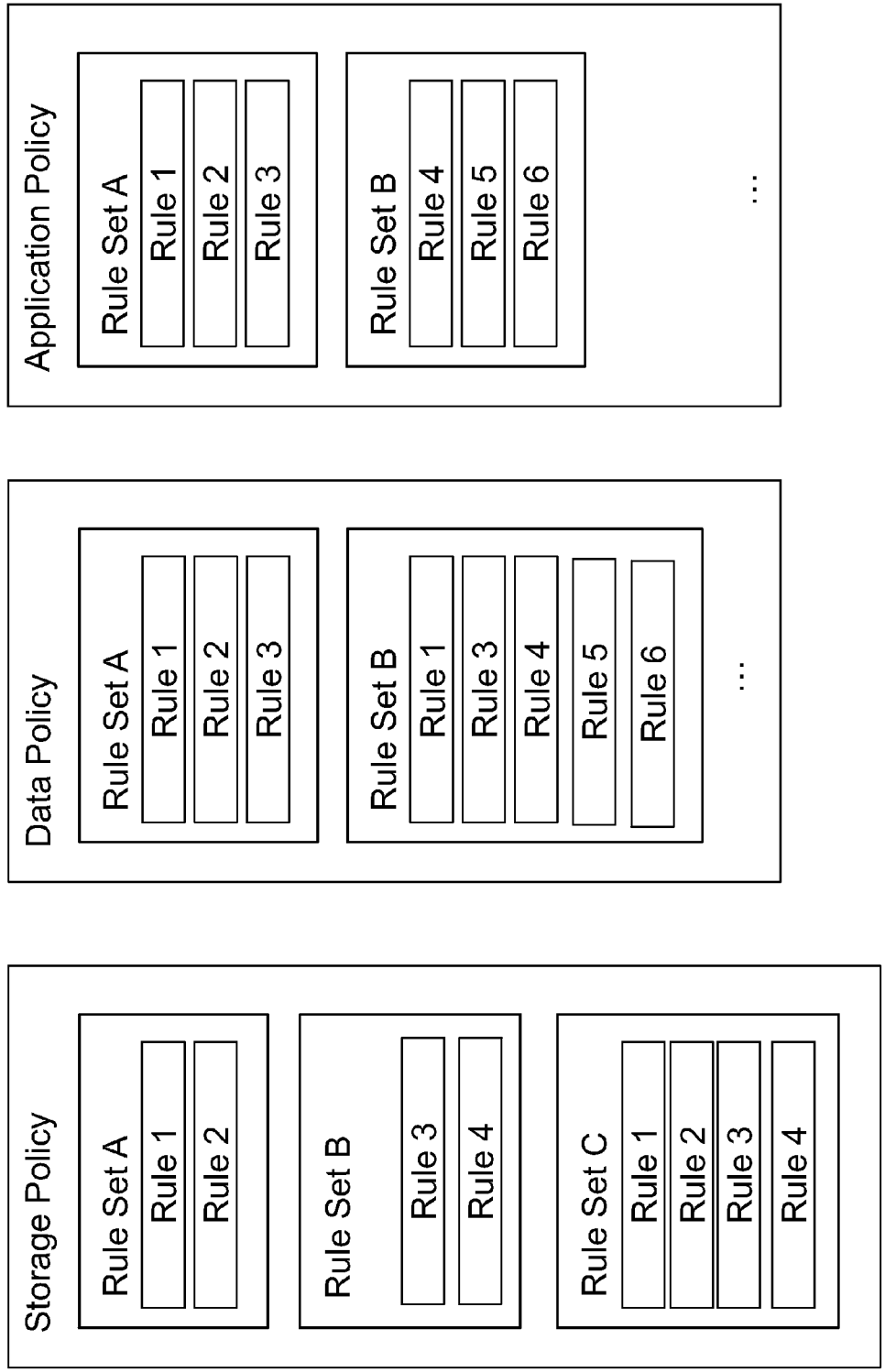
FIG. 7 is an example of policies and rules.

The policy engine computes data in the distributed data processing engine for deploying the service containers according to the rules in the policy database. A policy is the deployment requirements for service containers. It usually contains many rules. When a policy is applied, the storage system will start or shutdown service containers. For illustration, please refer to FIG. 7. Storage containers follow storage policy, data containers follow data policy, and application containers follow application policy. There are a number of policies for each service container. Each policy has a rule set including several rules. The rules may be different, e.g. all rules for the application policy. The rules may be partially the same, e.g. the rule 1 and rule 3 in rule set A and rule set B. The rules may be collected in one set and separated in another set, e. g. the rules in the storage policy. For better understanding, FIG. 8 gives an example. Rule 1 in rule set A requires CPU load to be at least 50% left in the next 60 minutes. Rule 2 in rule set A requires IOPS to be at least 50% left in the next 60 minutes. Rule 3 in rule set A requires network in to be at least 40% left in the next 60 minutes. Rule 1 to rule 3 should be fulfilled at the same time. If rule set A keeps, add application containers to the node host until all of these rules failed. Similarly, rule 4 in rule set B requires CPU load to be at least 15% left in the next 60 minutes. Rule 5 in rule set B requires IOPS to be at least 15% left in the next 60 minutes. Rule 6 in rule set B requires network in to be at least 25% left in the next 60 minutes. Rule 4 to rule 6 should be fulfilled at the same time. If rule set B keeps, remove application containers from the node host until all of these rules failed. If both rule set A and rule set B are failed, then application containers keep unchanged. All rules for respective service containers are listed above. It is not repeated again.

The common library can provide software logic for operating the node storage devices. It also provides image files of the service containers for deploying the service container. If a service container is requested by the rules, it is initiated from the image files by the storage operating system in the node host needing the service container. The operating module can configure customized I/O scheduler and/or storage service cache mechanism. It can also operate the node storage devices attached to one node host.

The messaging module 500 is a standalone server. It is linked to each node host. Function of the messaging module 500 is to bridge the node hosts in the cluster. In the present embodiment, only one cluster is used. In another embodiment, there may be two or more clusters which have a number of nodes. Thus, function of the messaging module 500 may bridge the node hosts and/or node hosts in different clusters. In fact, the messaging module is not limited to a server, it can be a hardware built in a master node host to manage bridging of all node hosts, or an application program installed in each node host.

Different storage operating systems may use different protocols for communications. Even in one node host, different protocols may be applied for different services. There are too many chatty communications among services and efficiency of the storage system will be reduced. An improved communication way is used by the present invention for the storage system. Coarse-grained REST (REpresentational State Transfer) API is used for communication between any two service containers. The course-grained REST APIs are HTTP request methods, such as GET, PUT, POST, DELETE, etc. A resource from an URL will be available to operate a service container instead of some protocols. Thus, these coarse-grained APIs eliminate chatty communications for the services. However, if two storage operating systems in two nodes are the same and already have a native protocol for a service, i.e. the second storage operating system 210 and the third storage operating system 310 for video metadata service and video streaming service, respectively, two service containers can communicate with each other through the native protocol.

It is obvious from the description above that the storage system is scalable. It can be both scale-up and scale-out. If workload of a service container is too heavy, another service container can be added to the same host node or other host node in the cluster for scale-up purpose. If more host or cluster is required to support locally (e.g. for host located in different office site or data center), more hosts are linked by the messaging module to scale out. In addition, location of one initiated service container may not need to be fixed on one node host. An I/O Profile service of a storage container may be deployed in every node. If the I/O Profile service detects the second node 20 encountered anomaly recently, while the third node 30 has been working good for a long time, it will instruct the third storage operating system 310 to remove the storage container of anomaly detection from the third node 30, and inform the second storage operating system 210 to deploy a storage container of anomaly detection. However, it is emphasized that each storage service should be initialized close to its data (in the same node host). That is to say related application, data, and storage containers should be in the same node host. For example, the application container 403 for video streaming is co-located with the data container 402 for Ceph storage on the same node host 40.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A storage system having nodes with light weight containers, comprising:
   at least one cluster, having a plurality of nodes linked to one another, each node having:
      a node host, operated by a storage operating system, and installed with a plurality of service containers, which are used for providing specific services to clients and/or operations of the node out of the service containers; and
      at least one node storage device, operated by the storage operating system, for providing storing and accessing of data for the service containers; and
   a messaging module, linked to each node host, for bridging the node hosts and/or node hosts in different clusters,
   wherein coarse-grained REST (REpresentational State Transfer) API (Application Programming Interface) is used for communication between any two service containers;
   wherein amount of the service containers included in the node host is adjusted according to workload of the service containers installed in the node host and amount of the node hosts included in the storage system is adjusted by the messaging module according to the needs to perform the specific services; and
   wherein the storage operating system comprises:
   a policy database, for storing rules which define conditions for each service container to be deployed in or removed from the node host;
   a distributed data processing engine, for coordinating every action of the specific service and the operations of the node out of the service containers of the node hosts, and processing the specific service and the operations; and
   a policy engine, for computing data in the distributed data processing engine and deploying the service containers according to the rules in the policy database.

2. The storage system according to claim 1, wherein the messaging module is a standalone server, a hardware built in a master node host to manage bridging of all node hosts, or an application program installed in each node host.

3. The storage system according to claim 1, wherein two service containers communicate with each other through a native protocol.

4. The storage system according to claim 1, wherein the service container provides a storage service for operating the node storage device, a data service for operating databases, or an application service for providing the specific service.

5. The storage system according to claim 4, wherein the storage service is a monitoring service, for monitoring performance metrics of each service container in the node.

6. The storage system according to claim 5, wherein the storage service is an anomaly detecting service, for detecting unusual patterns of the performance metric obtained by the monitoring service.

7. The storage system according to claim 4, wherein the storage service is a traffic modeling service, for creating a traffic model of at least one performance metric in the node and generating prediction of the performance metric(s).

8. The storage system according to claim 5 or 7, wherein the performance metric is CPU load, IOPS (Input/output Per Second), throughput, or latency of the storage system, cache hit ratio, or throughput of a network the storage system applied to.

9. The storage system according to claim 1, wherein the operating system further comprises:
   a common library, for providing software logic for operating the node storage device, and image files of the service containers for deploying the service container; and
   an operating module, for configuring customized I/O scheduler and/or storage service cache mechanism, and operating the node storage device.

10. The storage system according to claim 1, wherein the rule is:
   if a node host has a storage service with higher CPU load than a threshold value, more service containers of that storage service are deployed on other node hosts; if a cluster has lower average CPU load of a storage service than a threshold value, excess service containers of that storage service are removed; if a node host has a storage service with higher storage load or higher latency than a threshold value, more service containers of that storage service are deployed on other node hosts; if a node host has a storage service with higher network load or more network throughput than a threshold value, more service containers of that storage service are deployed on other nodes; if a node host has a higher predictive performance load than a threshold value, excess service containers are removed from that node; if a node host has an anomaly detected, excess service containers are removed from that node; if a detected anomaly exceeds a threshold value, all of the service containers in that node are removed; or service containers of the storage service are deployed as close to the node storage device storing the data they need to access as possible.

11. The storage system according to claim 1, wherein the rule is:
   if a node host has a data service with higher CPU load than a threshold value, more service containers of that data service are deployed on other node hosts; if a cluster has lower average CPU load of a data service than a threshold value, excess service containers of that data service are removed; if a node host has a data service with higher storage load or higher latency than a threshold value, more service containers of that data service are deployed on other node hosts; or if a node host has a data service with higher network load or more network throughput than a threshold value, more service containers of that data service are deployed on other nodes.

12. The storage system according to claim 1, wherein the rule is:

if a node host has an application service with higher CPU load than a threshold value, more service containers of that application service are deployed on other node hosts; if a cluster has lower average CPU load of an application service than a threshold value, excess service containers of that application service are removed; if a node host has an application service with higher storage load or higher latency than a threshold value, more service containers of that application service are deployed on other node hosts; or if a node host has an application service with higher network load or more network throughput than a threshold value, more service containers of that application service are deployed on other nodes.

* * * * *